US010942365B2

(12) United States Patent
Okumoto et al.

(10) Patent No.: US 10,942,365 B2
(45) Date of Patent: Mar. 9, 2021

(54) STEREOSCOPIC DISPLAY DEVICE

(71) Applicant: Mitsubishi Electric Corporation, Tokyo (JP)

(72) Inventors: Kazunori Okumoto, Tokyo (JP); Akimasa Yuuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/587,383

(22) Filed: Sep. 30, 2019

(65) Prior Publication Data
US 2020/0117017 A1  Apr. 16, 2020

(30) Foreign Application Priority Data

Oct. 15, 2018 (JP) .............................. JP2018-193954

(51) Int. Cl.
*G02B 30/27* (2020.01)
*G02F 1/1339* (2006.01)
*G02F 1/1335* (2006.01)

(52) U.S. Cl.
CPC ......... *G02B 30/27* (2020.01); *G02F 1/13394* (2013.01); *G02F 1/133512* (2013.01); *G02F 2001/13396* (2013.01)

(58) Field of Classification Search
CPC .................. G02F 2001/13396; G02F 1/1347
See application file for complete search history.

(56) References Cited

U.S. PATENT DOCUMENTS

| 2012/0236237 | A1 | 9/2012 | Kanari et al. |
| 2012/0268671 | A1* | 10/2012 | Inoue .................. G02F 1/13394 349/15 |
| 2014/0293173 | A1 | 10/2014 | Koito et al. |
| 2015/0362741 | A1* | 12/2015 | Oh ......................... G02B 30/27 349/15 |
| 2017/0031220 | A1* | 2/2017 | Yamamoto ........ G02F 1/136286 |
| 2017/0285389 | A1* | 10/2017 | Nishitani ............ G02F 1/13394 |
| 2018/0307077 | A1* | 10/2018 | Miura ................. G02F 1/13392 |

FOREIGN PATENT DOCUMENTS

| JP | 2012-194257 A | 10/2012 |
| JP | 2012-234142 A | 11/2012 |
| JP | 2014-197132 A | 10/2014 |

* cited by examiner

*Primary Examiner* — Alexander P Gross
(74) *Attorney, Agent, or Firm* — Studebaker & Brackett PC

(57) ABSTRACT

An object of the present invention is to reduce luminance unevenness caused by interference between a pixel and a PS in a barrier panel without making a design of the PS complicated in a parallax barrier system stereoscopic display device. A plurality of pixels are arranged at a regular pitch in an x direction and a y direction. A light barrier element includes a pair of glass substrates, a liquid crystal layer provided between the glass substrates, and a plurality of PSs provided between the glass substrates. The plurality of PSs are arranged at a regular pitch in the x direction and the y direction. Arrangement pitches of the plurality of PSs in the x direction and the y direction are not integral multiples of arrangement pitches of the plurality of pixels in the x direction and the y direction, respectively.

8 Claims, 10 Drawing Sheets

STEREOSCOPIC DISPLAY DEVICE

BACKGROUND OF THE INVENTION

Field of the Invention

The present invention relates to a stereoscopic display device of parallax barrier system.

Description of the Background Art

Recently, a stereoscopic display device capable of achieving a stereoscopic display attracts attention. The stereoscopic display device displays a video for a left eye and a video for a right eye corresponding to parallax of right and left eyes of an observer. The observer sees the video for the left eye with the left eye and sees the video for the right eye with the right eye, thereby recognizing a deep stereoscopic video.

Examples of a system of the stereoscopic display device include a parallax barrier system using a light barrier element. The light barrier element according to the parallax barrier system is mostly made up of a liquid crystal. Such a light barrier element is a barrier panel having a configuration of sandwiching a liquid crystal layer between a pair of substrates. A plurality of spacers are provided on the liquid crystal layer of the barrier panel to keep a space between the two substrates. The liquid crystal layer has a plurality of sub regions capable of independently transmit or block light.

The spacer provided on the barrier panel is formed by patterning. The spacer is also referred to as a column spacer or a post spacer (referred to as "PS" hereinafter). When the PSs are arrange on the barrier panel at intervals, there is a problem that the PSs interfere with a cyclic arrangement of pixels of the display panel, and periodic luminance unevenness occurs caused by moire phenomenon.

Japanese Patent Application Laid-Open No. 2012-194257 proposes, for this problem, that the PSs are arranged on the barrier panel in a random manner to reduce the cyclic luminance unevenness caused by the moire phenomenon. Japanese Patent Application Laid-Open No. 2012-234142 proposes that an arrangement direction of the PS on the barrier panel is inclined with respect to an arrangement direction of the pixels of the display panel to reduce the cyclic luminance unevenness caused by the moire phenomenon.

SUMMARY

However, these techniques in Patent Documents have a problem that a design of the PS becomes complex. An object of the present invention is to reduce luminance unevenness caused by interference between a pixel and a PS in a barrier panel without making a design of the PS complicated in a parallax barrier system stereoscopic display device.

A stereoscopic display device according to the present invention includes a display unit and a light barrier element. The light barrier element is disposed to overlap with the display unit. The display unit includes a black matrix region and a plurality of pixels. The black matrix region does not emit display light. Each of the plurality of pixels is an opening in the black matrix region and emits display light. The plurality of pixels are arranged at a regular pitch in a first direction and a second direction which is different from the first direction. The light barrier element includes a pair of barrier substrate, a first liquid crystal layer, and a plurality of first spacers. The first liquid crystal layer is provided between the pair of barrier substrates. The plurality of first spacers are provided between the pair of barrier substrates and arranged at a regular pitch in the first direction and the second direction. Arrangement pitches of the plurality of first spacers in the first direction and the second direction are not integral multiples of arrangement pitches of the plurality of pixels in the first direction and the second direction, respectively.

In the stereoscopic display device according to the present invention, the arrangement pitches of the plurality of first spacers in the first direction and the second direction are set to be deviated from the integral multiples of the arrangement pitches of the plurality of pixels in the first direction and the second direction, respectively. Luminance unevenness caused by interference between the pixel and the PS in the barrier panel can be reduced by the simple design of the first spacer.

These and other objects, features, aspects and advantages of the present invention will become more apparent from the following detailed description of the present invention when taken in conjunction with the accompanying drawings.

DESCRIPTION OF THE PREFERRED EMBODIMENTS

A. Embodiment 1

Figure 1:
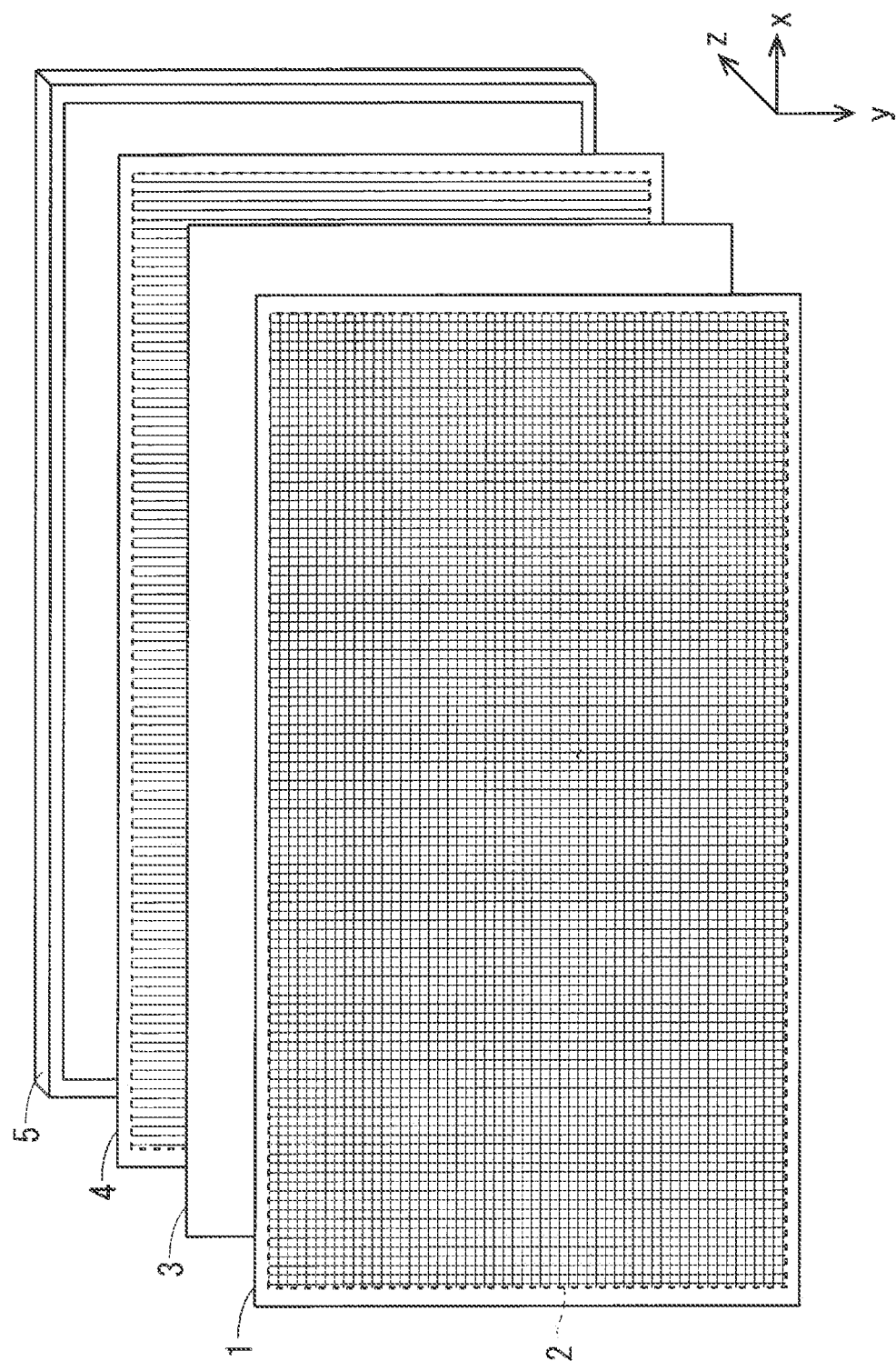
FIG. 1 is a perspective view schematically showing a whole configuration of a stereoscopic display device according to an embodiment 1.
Figure 2:
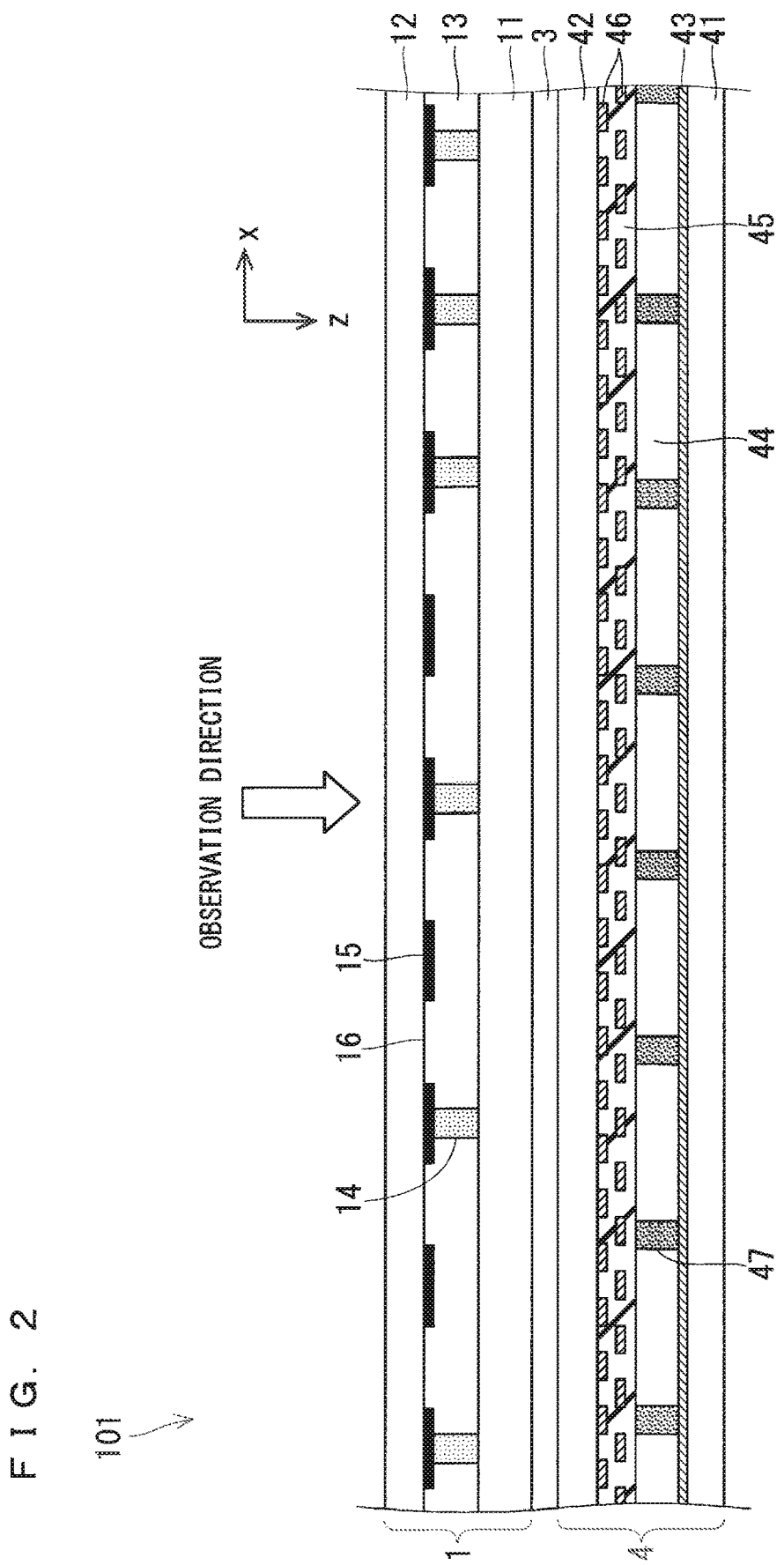
FIG. 2 is a cross-sectional view of the stereoscopic display device according to the embodiment 1 in an x direction.
Figure 3:
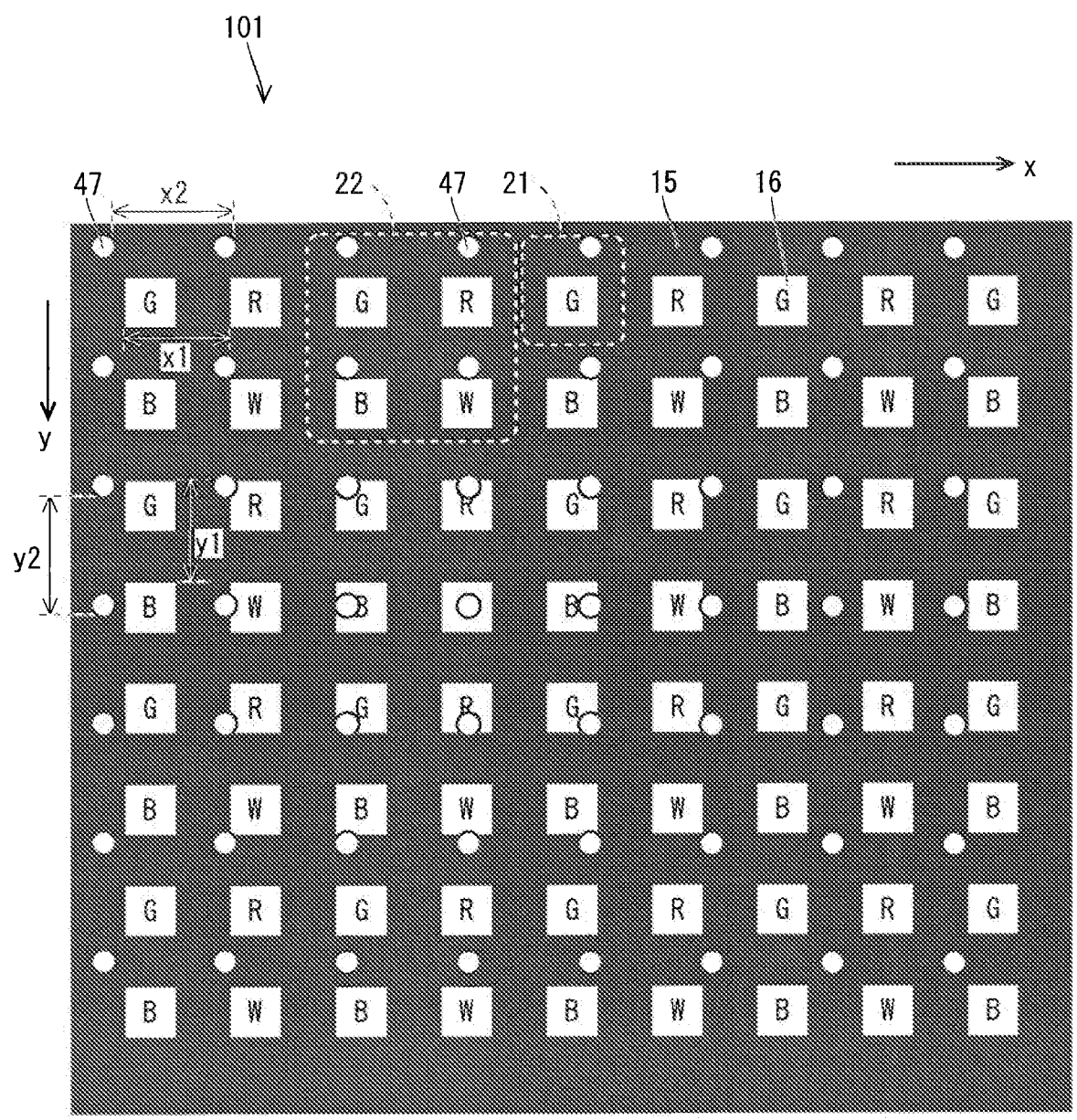
FIG. 3 is a plan view illustrating a positional relationship between PSs in a barrier panel and a BM region in the stereoscopic display device according to the embodiment 1.
Figure 4:
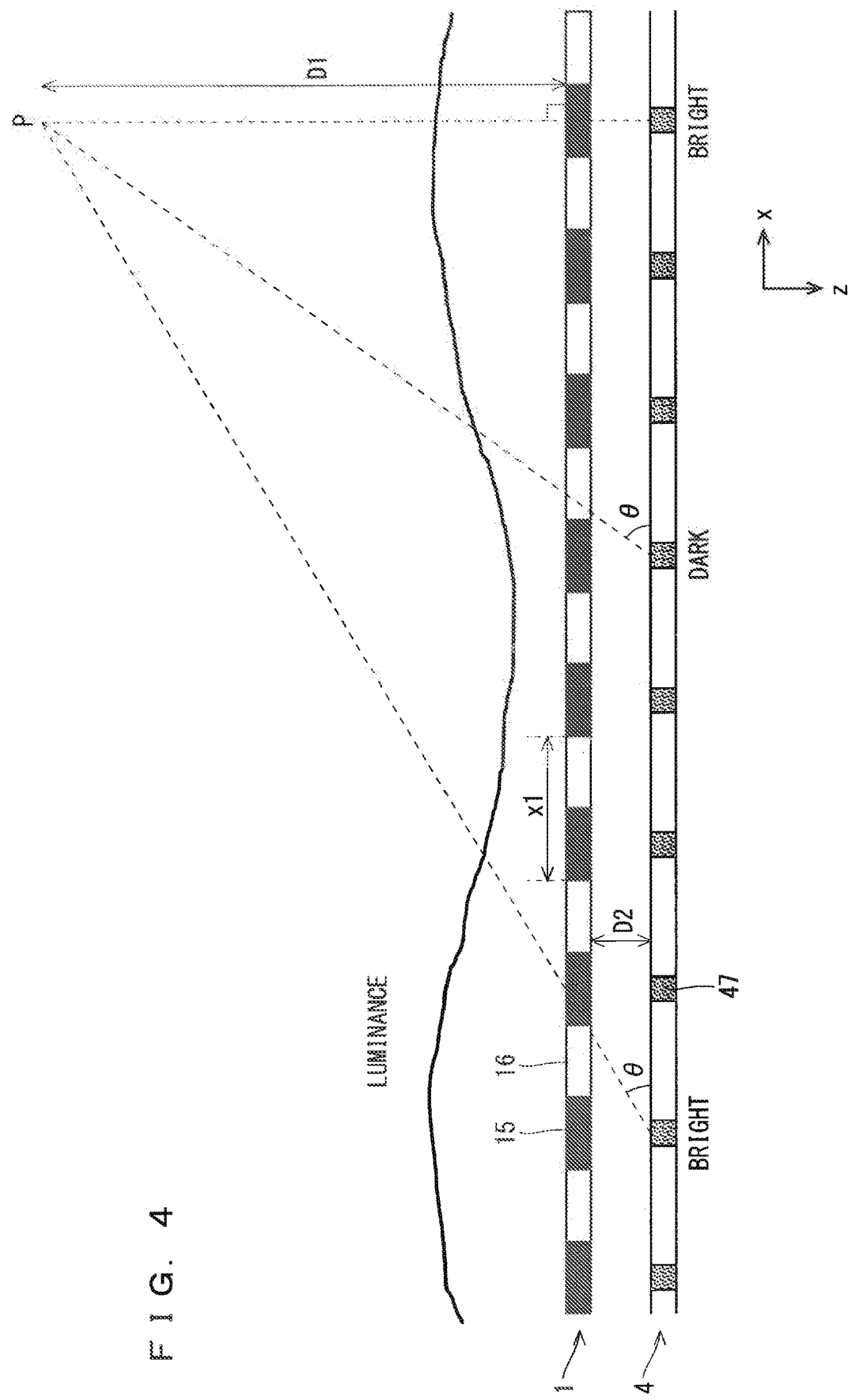
FIG. 4 is a drawing illustrating a luminance change in the x direction in a stereoscopic display device according to a comparison example.
Figure 5:
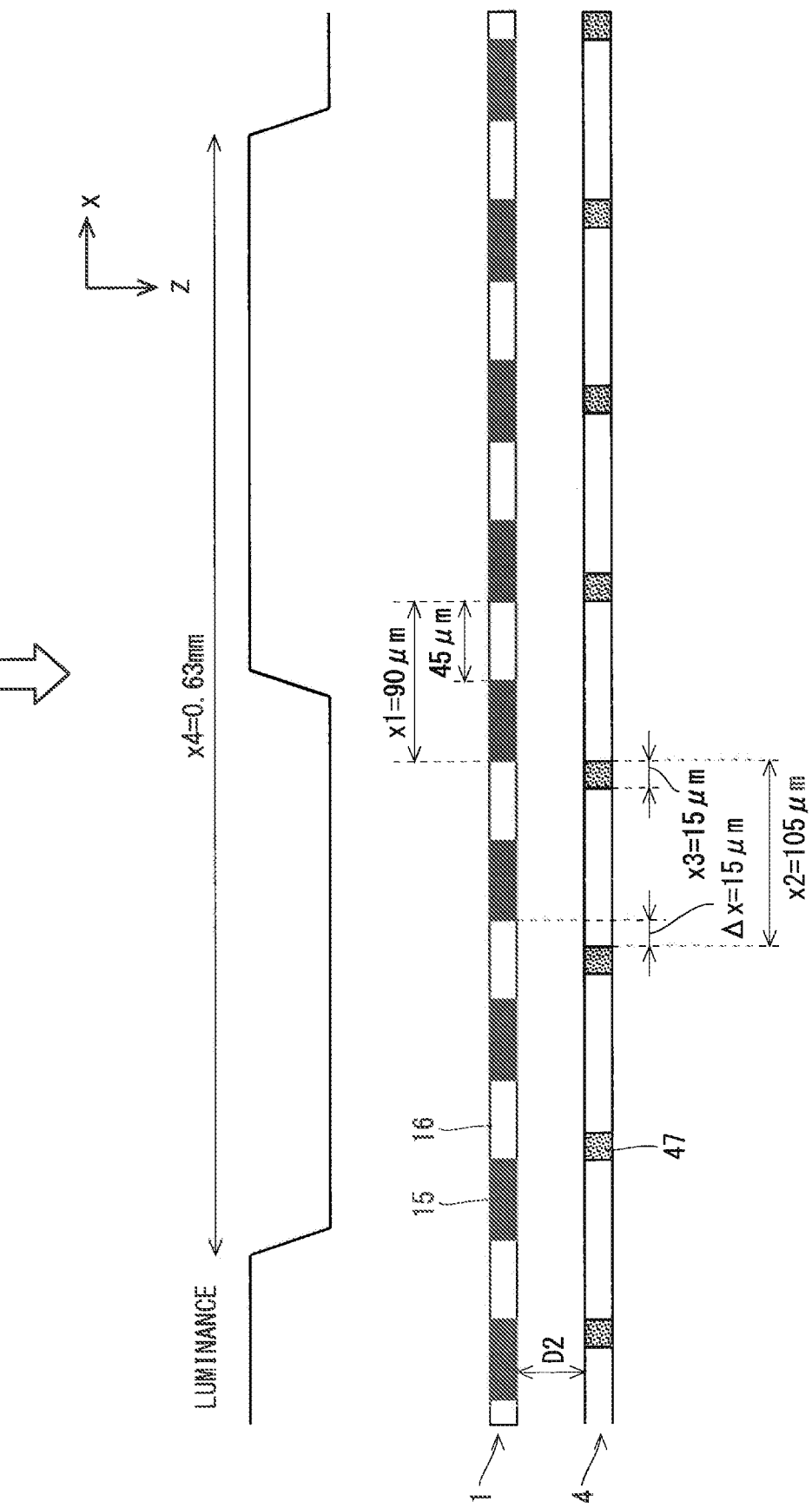
FIG. 5 is a drawing illustrating a luminance change in the x direction in the stereoscopic display device according to the embodiment 1.

A stereoscopic display device 101 according to an embodiment 1 is described using FIG. 1 to FIG. 5. FIG. 1 is a perspective view schematically illustrating a whole configuration of the stereoscopic display device 101. A direction along a long side of a display region 2 from left to right on a paper sheet of FIG. 1 is defined as an x direction, a direction along a short side of the display region 2 from top to bottom of the paper sheet of FIG. 1 is defined as a y direction, and a depth direction in the stereoscopic display device 101 perpendicular to the x direction and the y direction is defined as a z direction. The x direction and the y direction are also referred to as a first direction and a second direction, respectively. FIG. 2 is a cross-sectional view in an xz plane of the stereoscopic display device 101. FIG. 3 is a plan view illustrating a positional relationship between a column spacer and a black matrix (BM) in a barrier panel in the stereoscopic display device 101. FIG. 4 is a schematic view illustrating a luminance change in the x direction in a stereoscopic display device according to a comparison example. FIG. 5 is a schematic view illustrating a luminance change in the x direction in the stereoscopic display device 101.

As illustrated in FIG. 1, the stereoscopic display device 101 has a configuration that a display panel 1, a barrier panel 4, and a backlight 5 are stacked in this order. The display panel 1 includes a display region 2, and functions as a display unit. The barrier panel 4 is a light barrier element disposed to overlap with the display panel 1, and is bonded to the barrier panel 4 by a transparent adhesion layer 3. The transparent adhesion layer 3 is made up of a transparent material having an infraction index relatively close to glass.

The display panel 1 is a non-light emitting liquid crystal panel, thus the backlight 5 is disposed on a side of a back surface of the barrier panel 4, that is to say, a positive side of a z axis. The display panel 1 is located on a front side and the backlight 5 is located on a rear side in relation to an observer. A configuration that the order of stacking the display panel 1 and the barrier panel 4 is opposite to that illustrated in FIG. 1 is also applicable as the stereoscopic display device as long as backlight 5 is located on the side of the back surface of the display panel 1.

As illustrated in FIG. 2, the display panel 1 includes two glass substrates 11 and 12, a liquid crystal layer 13 sandwiched between the glass substrates 11 and 12, and column spacers (referred to as "PS" hereinafter) 14 disposed between the glass substrates 11 and 12 to keep a certain distance therebetween. That is to say, the display panel 1 is a liquid crystal panel. The glass substrates 11 and 12 are substrates constituting the display panel 1, thus are also referred to as the display substrates. The liquid crystal layer 13 is also referred to as the second liquid crystal layer. A black matrix region (referred to as "the BM region" hereinafter) 15 is provided on a surface of the glass substrate 12 facing with the liquid crystal layer 13. The BM region 15 is formed in a part of the surface of the glass substrate 12 facing with the liquid crystal layer 13, and a BM opening 16 which is a region where the BM region 15 is not formed transmits light. The other configuration such as a polarization plate, an electrode driving the liquid crystal layer, and a switching element controlling signals are variously provided in the display panel 1, however, they are not major configurations, thus the illustration is omitted in FIG. 2, and the description thereof is omitted here.

As illustrated in FIG. 2, the barrier panel 4 includes two glass substrates 41 and 42, a liquid crystal layer 44 sandwiched between the glass substrates 41 and 42, and column spacers (referred to as "PS" hereinafter) 47 disposed between the glass substrates 41 and 42 to keep a certain distance therebetween. The glass substrates 41 and 42 are substrates constituting the barrier panel 4, thus are also referred to as the barrier substrates. The liquid crystal layer 44 is also referred to as the first liquid crystal layer, and the PS 47 is also referred to as the first spacer. A liquid crystal drive electrode 43 is provided on a surface of the glass substrate 41 facing with the liquid crystal layer 44, and a liquid crystal drive electrode 46 is provided on a surface of the glass substrate 42 facing with the liquid crystal layer 44. The liquid crystal drive electrodes 43 and 46 are transparent electrodes driving the liquid crystal layer 44. The liquid crystal drive electrode 46 is made up of a plurality of electrodes divided in the y direction, and extends in the y direction as illustrated in FIG. 2. The divided liquid crystal drive electrode 46 can independently apply voltage to the liquid crystal layer 44. A region in the liquid crystal layer 44 controlled by one liquid crystal drive electrode 46 is referred to as a sub region. That is to say, the sub region extends in the y direction and is arranged in the x direction in the manner similar to the liquid crystal drive electrode 46. The transmission or block of the light in the sub region in the liquid crystal layer 44 is controlled by controlling voltage of each liquid crystal drive layer 46. The adjacent liquid crystal drive electrodes 46 are insulated by an insulation layer 45 and arranged to be vertically alternating with each other.

In the example in FIG. 2, in the pair of glass substrates 41 and 42 constituting the barrier panel 4, the divided plurality of liquid crystal drive electrodes 46 are disposed on the glass substrate 42 on the side of the front surface, and one liquid crystal drive electrode 43 is disposed on an entire surface of the glass substrate 41 on the side of the back surface. The divided plurality of liquid crystal drive electrodes need to be disposed on one of the glass substrates 41 and 42, and one liquid crystal drive electrode needs to be formed on the other one of the glass substrates 41 and 42. Accordingly, it is also applicable that the liquid crystal drive electrode 46 is made up of one electrode, and the liquid crystal drive electrode 43 is made up of the divided electrodes.

In the barrier panel 4, the sub region blocking the light constitutes a barrier region, and the sub region transmitting the light constitutes a barrier opening region. Positions of the barrier region and the barrier opening region are adjusted so that display light from specific pixels corresponding to a three-dimensional image is visually recognized by right and left eyes of the observer, thus the barrier panel 4 functions as a parallax barrier. Furthermore, the barrier region and the barrier opening region are moved in accordance with a movement of the observer in the x direction perpendicular to a division direction of the liquid crystal drive electrode 43, thus the barrier panel 4 functions as a movable parallax barrier having a following function of following the observer.

Described next using FIG. 3 is a planar positional relationship of a location of the PS 47 in the barrier panel 4 with the BM region 15 in the display panel 1. As illustrated in FIG. 3, the BM opening 16 is arranged in matrix in the x direction and the y direction. One BM opening 16 constitutes one pixel 21 in the display panel 1. In FIG. 3, characters of R, G, and B are assigned to the BM opening 16, and they indicate that the BM opening 16 corresponds to an R pixel, a G pixel, and a B pixel. In FIG. 3, the PS 47 and the BM region 15 are illustrated in the same plane, however, FIG. 3 illustrates a planar positional relationship therebetween, thus the PS 47 and the BM region 15 are actually formed on different planes as illustrated in FIG. 2.

The pixel 21 is arranged at a regular pitch in the x direction and the y direction. An arrangement pitch of the pixel 21 in the x direction is referred to as x1, and an arrangement pitch in the y direction is referred to as y1. The PS 47 is arranged at a regular pitch in the x direction and the y direction in the manner similar to the pixel 21. An arrangement pitch of the PS 47 in the x direction is expressed as x2, and an arrangement pitch in the y direction is expressed as y2. Values of the arrangement pitches x2 and y2 of the PS 47 are set to be different from integral multiples of the arrangement pitches x1 and y1 of the pixel 21. In the simplest case, the values of the arrangement pitches x2 and y2 of the PS 47 are set to be larger than the single arrangement pitches x1 and y1 of the pixel 21 by a diameter of one PS 47. That is to say, when a diameter of an end surface of the PS 47 having a column shape is expressed as a, equations of x2=x1+a and y2=y1+a are established. The arrangement pitch of the pixel 21 is also simply referred to as the pixel pitch hereinafter.

The two types of display light emitted from the different pixels in the display panel 1 need to be visually recognized by the right eye and the left eye of the observer, respectively, by controlling the transmission or block of the light in the sub region so that the barrier panel 4 functions as the parallax barrier. In order to achieve this function, a distance D2 from the display panel 1 to the barrier panel 4 is generally set to approximately equal to or larger than 0.5 mm and smaller than 2 mm, and a size of the pixel pitch in the display panel 1 is set to approximately equal to or larger than 50 μm and smaller than 100 μm. That is to say, the distance D2 from the display panel 1 to the barrier panel 4 is ten times larger than the size of the pixel pitch.

Accordingly, a problem described below occurs in the stereoscopic display device according to the comparison example. FIG. 4 illustrates a luminance distribution in the x direction in the stereoscopic display device according to the comparison example. In the stereoscopic display device according to the comparison example, the arrangement pitches x2 and y2 of the PS 47 are the same as the arrangement pitches x1 and y1 of the pixel 21, and the PS 47 is disposed to overlap with a region where the BM region 15 is formed in a planar view in the z axis direction. When an observation point is an infinite distance, an observation angle θ is 90 degrees in the whole display region 2, and all the PSs 47 are completely hidden by the BM region 15. However, when the observation is performed in an actual observation point, the observation angle θ differs according to each position in the display region 2. The observation angle θ is defined as an angle between a line connecting the observation point and a position on a display screen and the x axis. The PS 47 which is a non-transmission region is exposed to the BM opening 16 or hidden by the BM region 15 in each position on the display screen depending on the difference of the observation angle θ.

More specifically, the PS 47 is completely hidden by the BM region 15 in a position on the display screen located in a front direction of the observation point. The PS 47 next to the PS 47 in the front direction is exposed to the BM opening 16 by approximately 1 μm in accordance with a change of the observation angle θ. The PS 47 next to the PS 47 in the front direction is exposed to the BM opening 16 by approximately 2 μm in accordance with a change of the observation angle θ. In this manner, in the stereoscopic display device according to the comparison example, the degree of exposure of the PS 47 from the BM opening 16 gradually changes in accordance with the change of the observation angle θ. As a result, the position on the display screen where the PS 47 is hidden by the BM region 15 is in a high-luminance region, that is to say, a bright section, and the position on the display screen where the PS 47 is exposed from the BM opening 16 is in a low-luminance region, that is to say, a dark section. The bright section and the dark section periodically appear in accordance with the observation angle.

A graph in FIG. 4 conceptually shows a relative illuminance change at the time of observing each position on the display screen from an observation point P. A repeating pitch between the bright section and the dark section changes in accordance with a distance D1 from the observation point P to the display panel 1, a pixel pitch x1, and the distance D2 from the display panel 1 to the barrier panel 4. For example, when D1 is 60 cm, x1 is 60 μm, and D2 is 1 mm, the dark section periodically occurs approximately every 36 mm. That is to say, the repeating pitch of the dark section is approximately 36 mm. As described above, a luminance distribution continuously changing at the pitch of approximately 36 mm is recognized as luminance unevenness, that is to say, moire phenomenon.

In the meanwhile, in the stereoscopic display device 101 according to the embodiment 1, the arrangement pitch of the PS 47 is deviated from an integral multiple of the pixel pitch of the display panel 1. Specifically, the arrangement pitch of the PS 47 is set to be larger than the single pixel pitch and smaller than twice the pixel pitch. Accordingly, the relative planar positional relationship with the BM region 15 is changed by intention between the adjacent PSs 47. A more specific positional relationship between the PS 47 and the BM region 15 in the stereoscopic display device 101 is described using FIG. 5.

FIG. 5 illustrates the positional relationship between the PS 47 in the barrier panel 4 and the BM region 15 in the display panel 1 in along xz cross section. A diameter x3 of the PS 47 is set to 15 μm. The arrangement pitch x2 of the PS 47 in the x direction is deviated from the integral multiple of the pixel pitch x1 in the x direction by Δx. Herein, Δx is set to 15 μm, which is equal to x3. When the arrangement pitch x2 of the PS 47 in the x direction is deviated from the single pixel pitch x1 in the x direction by Δx, s2 is 105 μm. When a width of each of the BM region 15 and the BM opening 16 is set to 45 the bright section where the PS 47 is hidden by the BM region 15 and the dark section where the PS 47 is exposed to the BM opening 16 are switched every three pixels in the observation from the infinite distance. Accordingly, a pitch x4 of the bright section and dark section is small, that is 0.63 mm, thus the luminance distribution between light and dark is not recognized.

Herein, the deviation amount Δx of the arrangement pitch x2 of the PS 47 in the x direction deviated from the pixel pitch x1 is 15 μm, which is equal to the diameter x3 of the PS 47, but is not limited thereto. However, when the deviation amount Δx is small, the number of PSs 47 continuously hidden by the BM region 15 or exposed to the BM opening 16 increases, thus the pitch x4 of the bright section and dark section gets large. Accordingly, the deviation amount Δx is preferably set to equal to or larger than 3 μm, and more effect can be achieved when the deviation amount Δx is set to equal to or larger than 5 μm. The arrangement pitch x2 of the PS 47 in the x direction is deviated from the integral multiple of the pixel pitch x1 in the x direction, thus an upper limit of the deviation amount Δx is smaller than the pixel pitch x1 in the x direction.

FIG. 5 illustrates the arrangement pitch x2 of the PS 47 in the x direction, and the same applies to the arrangement pitch y2 in the y direction.

In FIG. 3, characters R, G, B, and W put in the BM opening 16 express colors of pixels 21, respectively. As illustrated in FIG. 3, pixels of four colors of R (red), G (green), B (blue), and W (white) are arranged in 2-by-2 matrix in the display panel 1. These four pixels as a basic unit constitute a picture element 22 which is a colored point constituting an image. The picture element 22 is sequentially disposed to constitute the display region. That is to say, a picture element pitch which is the arrangement pitch of the picture element 22 is twice as large as the pixel pitch. The pixel 21 and the picture element 22 are disposed as described above in the display panel 1, thus the PS 47 disposed at the arrangement pitch deviated from the integral multiple of the pixel pitch is also disposed to be deviated from the picture element pitch. As a result, the color of the pixel in the BM opening 16 from which the PS 47 is exposed is equalized regardless of the observation angle, and a color unevenness is reduced.

As described above, the stereoscopic display device 101 according to the embodiment 1 includes the display unit and the light barrier element disposed to overlap with the display unit. The display unit includes the BM region 15 which does not emit the display light and the plurality of pixels 21, each of which is the opening in the BM region 15 and emits the display light. The plurality of pixels 21 are arranged at the regular pitch in the first direction and the second direction which is different from the first direction. The light barrier element includes the glass substrates 41 and 42 which is the pair of barrier substrates, the liquid crystal layer 44 which is the first liquid crystal layer provided between the pair of glass substrates 41 and 42, and the PSs 47 which are the plurality of first spacers disposed between the pair of glass substrates 41 and 42. The plurality of PSs 47 are arranged at the regular pitch in the first direction and the second direction. The arrangement pitches of the plurality of PSs 47 in the first direction and the second direction are not the integral multiples of the arrangement pitches of the plurality of pixels 21 in the first direction and the second direction, respectively. Accordingly, the cycle of the bright section where the PS 47 is hidden by the BM region 15 and the dark section where the PS 47 is exposed to the BM opening 16 is shortened, and visibility of moire is reduced.

B. Embodiment 2

The PS 47 in the barrier panel 4 causes the occurrence of the moire, thus is preferably as small as possible in number. A volume of the liquid crystal layer 44 in the barrier panel 4 fluctuates in accordance with a temperature change. Accordingly, when a range of operating temperature is large as is the case for in-vehicle use, a thickness of the liquid crystal layer 44 significantly fluctuates. If an arrangement density of the PS 47 is high, the PS 47 cannot sufficiently follow the fluctuation of the thickness of the liquid crystal layer 44, so that there is a concern that air bubble occurs in the barrier panel 4 or the luminance unevenness and the color unevenness occur. That is to say, the PS 47 of the barrier panel 4 is preferably as small as possible in number also when it is used in the wide range of operating temperature. Accordingly, the embodiment 2 describes a stereoscopic display device in which the number of the PSs 47 is reduced in the barrier panel 4 and the display panel 1 has a dual spacer structure to correspond to the wide range of operating temperature.

Figure 6:
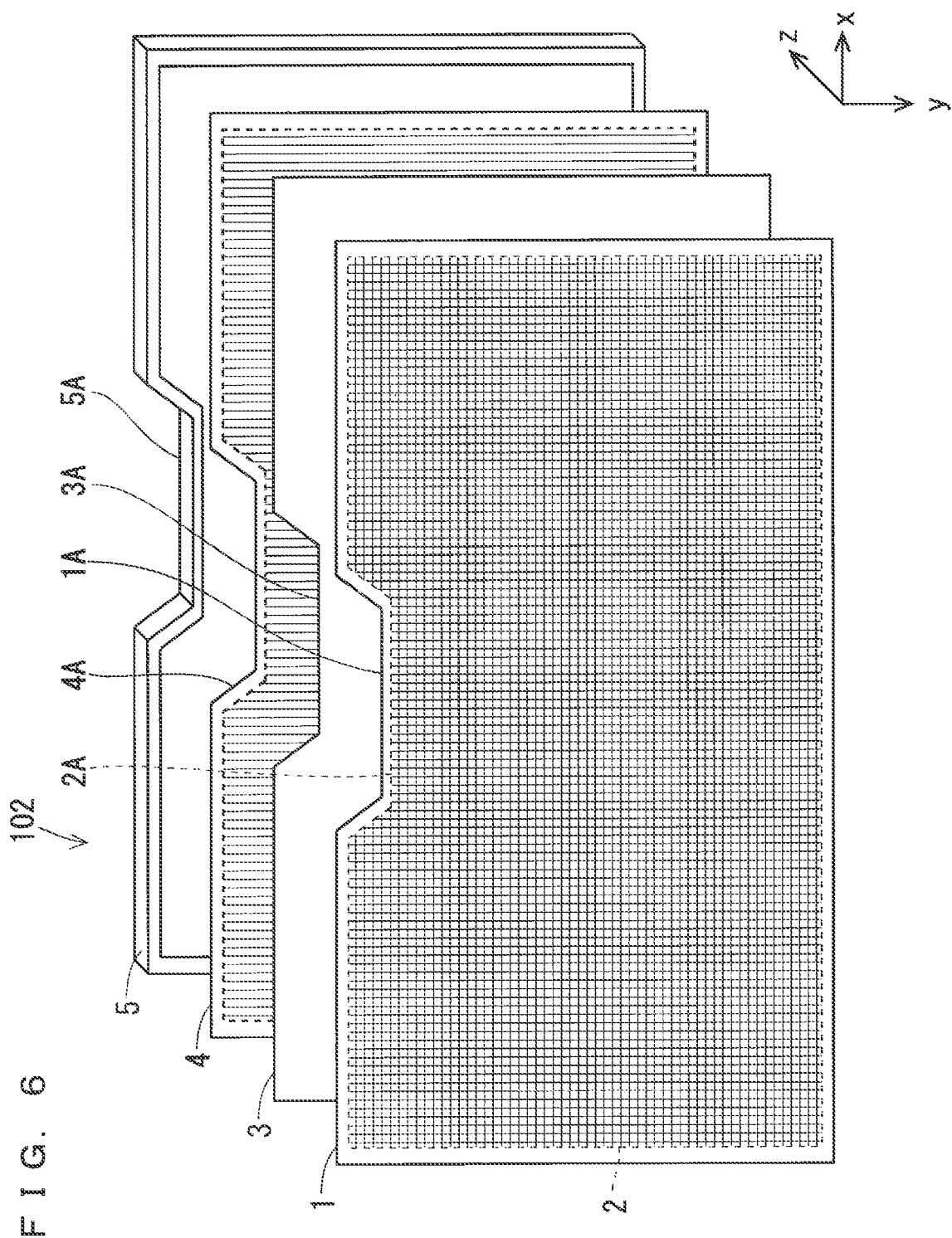
FIG. 6 is a perspective view schematically showing a whole configuration of a stereoscopic display device according to an embodiment 2.
Figure 7:
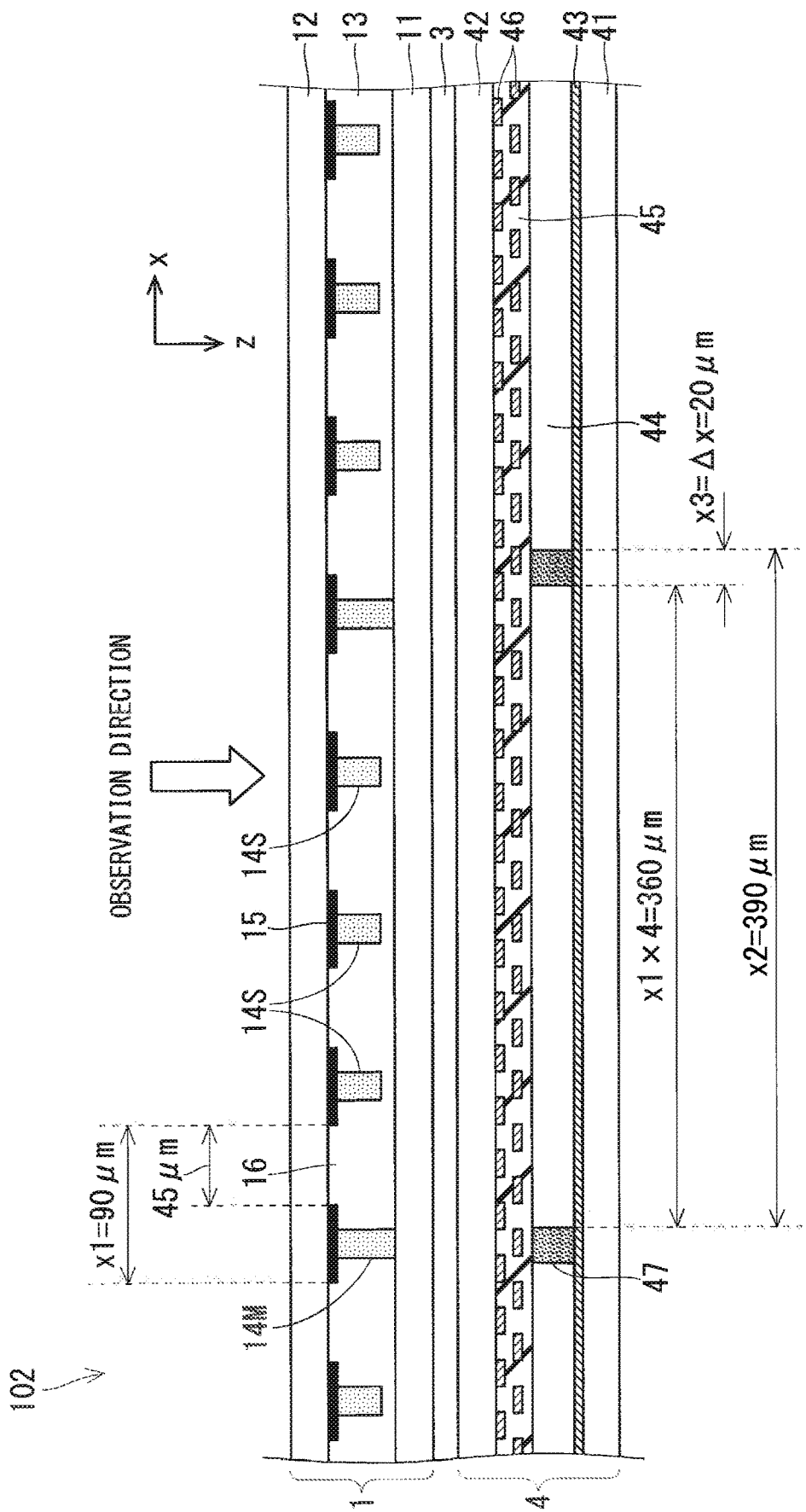
FIG. 7 is a cross-sectional view of the stereoscopic display device according to the embodiment 2 in the x direction.
Figure 8:
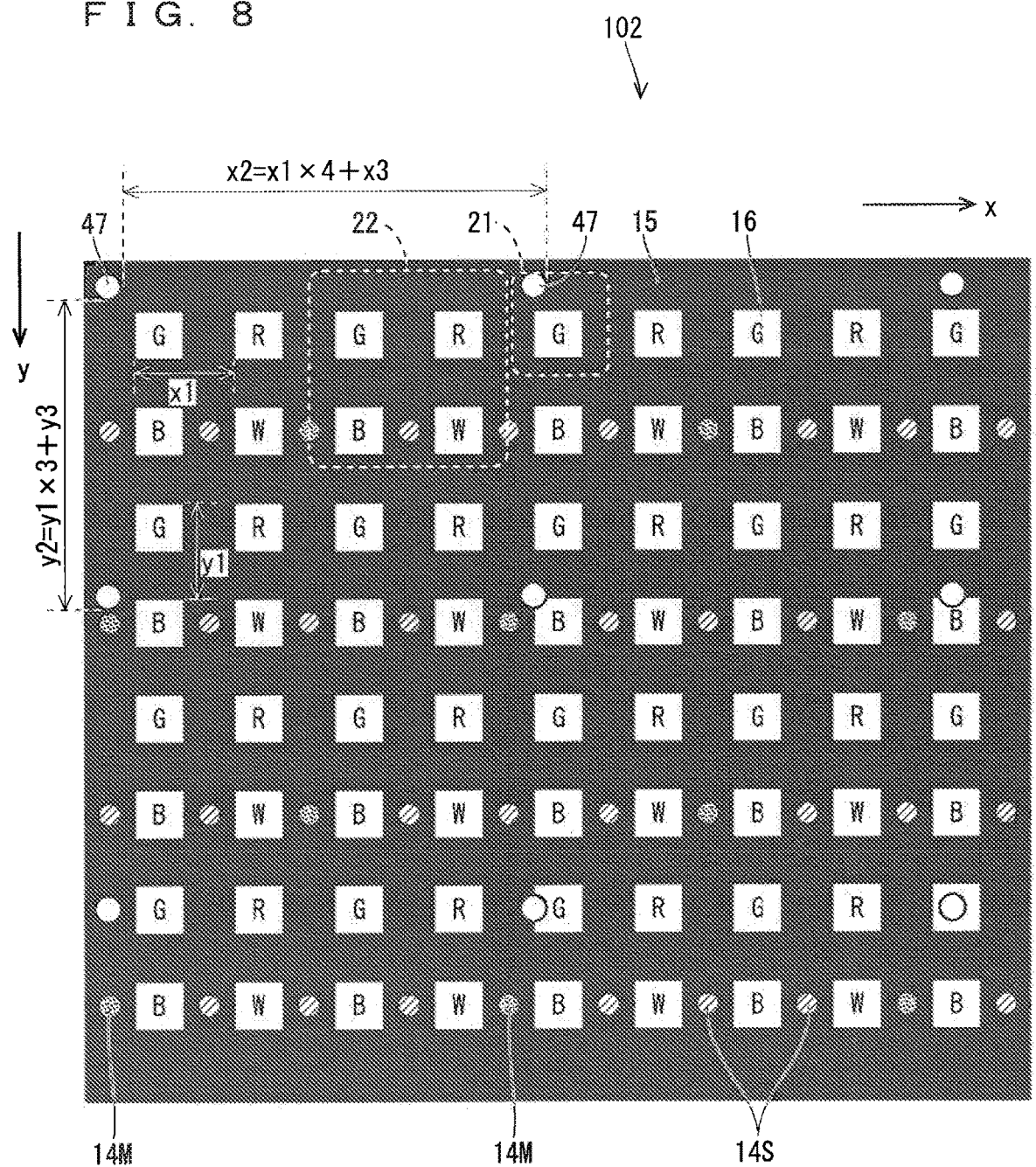
FIG. 8 is a plan view illustrating a positional relationship between PSs in a barrier panel, PSs in a display panel, and a BM region in the stereoscopic display device according to the embodiment 2.

A stereoscopic display device 102 according to the embodiment 2 is described hereinafter using FIG. 6 to FIG. 8. FIG. 6 is a perspective view schematically illustrating a whole configuration of the stereoscopic display device 102. In FIG. 6, directions of x, y, and z axes are similar to those in FIG. 1. FIG. 7 is a cross-sectional view in an xz plane of the stereoscopic display device 102. FIG. 8 is a plan view illustrating a positional relationship between a PS and a BM in the stereoscopic display device 102. FIG. 6 to FIG. 8 correspond to FIG. 1 to FIG. 3 in the embodiment 1, respectively. In FIG. 6 to FIG. 8, the same reference numerals are assigned to the same or corresponding constituent elements in the embodiment 1. In a configuration of the stereoscopic display device 102, the description hereinafter is focused on a difference with the stereoscopic display device 101, and the description of the common part is appropriately omitted.

As illustrated in FIG. 6, the stereoscopic display device 102 has a configuration, similar to that of the stereoscopic display device 101, that the display panel 1 and the barrier panel 4 are disposed to overlap with each other with the transparent adhesion layer 3 therebetween, and the backlight 5 is disposed on the back surface of the barrier panel 4. The display panel 1, the display region 2, the transparent adhesion layer 3, the barrier panel 4, and the backlight 5 do not have a complete rectangular shape but have an odd shape with concave notched portions 1A, 3A, 4A, and 5A in a center part of each upper side thereof. Recently, the display device having such an odd shape is commonly used in an in-vehicle display displaying meters and gauges on both sides of the notched portion. However, in the manner similar to the stereoscopic display device 101 according to the embodiment 1, it is applicable that the display panel 1, the display region 2, the transparent adhesive layer 3, the barrier panel 4, and the backlight 5 in the stereoscopic display device 102 have a rectangular shape without the notched portions 1A, 3A, 4A, and 5A.

As illustrated in FIG. 7, the display panel 1 in the stereoscopic display device 102 has a dual spacer structure including a plurality of main spacers 14M and a plurality of sub spacers 14S. In normal times, the main spacer 14M is in contact with both the glass substrates 11 and 12, and keeps a predetermined distance between the glass substrates 11 and 12. Herein, the normal times indicate a state where, at normal temperature, an external pressure such as a pressure with a finger is not particularly applied on a panel surface. The sub spacer 14S has a length shorter than the main spacer 14M in a thickness direction of the liquid crystal layer 13, and is in contact with only the glass substrate 12.

The main spacers 14M are disposed at a lower ratio than the main spacers 14M. As illustrated in FIG. 8 as an example, one main spacer 14M is disposed for eight pixels, and the three sub spacers 14S are disposed for eight pixels. Each of the main spacer 14M and the sub spacer 14S has a diameter of 16 μm.

Next, a planar positional relationship between the PS and a BM 16 is described using FIG. 7 and FIG. 8. As illustrated in FIG. 8, also in the stereoscopic display device 102, the BM opening 16 and the PS 47 in the barrier panel 4 are arranged at a regular pitch in the x direction and the y direction in the manner similar to the stereoscopic display device 101. The main spacer 14M and the sub spacer 14S in the display panel 1 are also arranged at a regular pitch in the x direction and the y direction. The arrangement pitch of the PS 47 in the stereoscopic display device 102 is similar to that of the PS 47 in the stereoscopic display device 101 in that the arrangement pitch is deviated from the integral multiple of the pixel pitch, and is set to a larger pitch. According to such a configuration, the number of the PSs 47 arranged in the stereoscopic display device 102 is smaller than that of the PSs 47 arranged in the stereoscopic display device 101.

As illustrated in FIG. 8, a diameter of the PS 47 having a column shape in the stereoscopic display device 102 is larger than the diameter of the PS 47 in the stereoscopic display device 101, that is 20 μm. The arrangement pitch of the PS 47 is deviated from the integral multiple of the pixel pitch by 20 μm. FIG. 8 illustrates an example that the arrangement pitch of the PS 47 is deviated from four times the pixel pitch in the x direction by 20 μm, and is deviated from three times the pixel pitch in the y direction by 20 μm. That is to say, when the pixel pitch in the x direction is x1 and the size of the PS 47 in the x direction is x3, the arrangement pitch x2 of the PS 47 in the x direction is expressed as x2=x1×4+x3, When the pixel pitch in the y direction is y1 and the size of the PS 47 in the y direction is y3, the arrangement pitch of the PS 47 in the y direction is expressed as y2=y1×3+y3. That is to say, when the pixel pitch in the x direction and the y direction is set to 90 μm, each PS 47 is arranged at a regular pitch of 380 μm in the x direction and 290 μm in the y direction. At this time, one PS 47 is disposed for approximately twelve pixels, and the arrangement density of the PS 47 is calculated to be approximately 0.28% in accordance with (an arrangement area for one PS 47)/(an area occupied by twelve pixels). Herein, the arrangement density of the PS 47 is defined as a ratio of a contact area of the PS 47 to an arrangement surface of the PS 47, and the arrangement density is also defined in the similar manner in the other constituent elements.

In the meanwhile, one main spacer 14M in the display panel 1 is disposed for eight pixels, thus the arrangement density thereof is calculated to be approximately 0.31% in accordance with (the arrangement area for one main spacer 14M)/(area occupied by the twelve pixels).

The arrangement density of the PS 47 in the barrier panel 4 may be equal to or lower than the arrangement density of the main spacer 14M in the dual spacer structure in the display panel 1 designed on an assumption of the in-vehicle use in the wide temperature range from low temperature to high temperature. Accordingly, the air bubble and the luminance unevenness do not occur in the barrier panel 4 in the wide temperature range.

A specific measure of the arrangement density of the PS 47 in the single barrier panel 4 is as follows on an assumption that a display device other than the liquid crystal panel is applied to the display panel 1. That is to say, in the liquid crystal display device having the dual spacer structure, when the arrangement density of the PS 47 is set to equal to or larger than 0.1% and smaller than 0.3%, for example, using the arrangement density of the main spacer where the air bubble and the luminance unevenness do not occur as a measure, the air bubble and the luminance unevenness do not occur in the barrier panel 4 in the wide temperature range. It is also applicable to adopt a size based on a design value or an average value of areas in a height direction to the area of one PS 47 necessary to calculate the arrangement density described above. When the average value of the areas in the height direction is used, the arrangement density can be calculated with a higher degree of accuracy.

It is also applicable to use the number of pixels for one PS 47 as a measure of the arrangement density of the PS 47 without using the arrangement density described above. For example, when one PS 47 is disposed for the continuous ten or more pixels 21, it is possible that the air bubble and the luminance unevenness do not occur in the barrier panel 4 in the relatively wide temperature range.

As illustrated in FIG. 7, a single spacer structure is adopted in the barrier panel 4 in the stereoscopic display device 102. That is to say, all the PSs 47 provided in the barrier panel 4 are in contact with both the glass substrates 41 and 42, and keeps a space between the glass substrates 41 and 42. The barrier panel 4 does not have the sub spacer in the dual spacer structure. A reason thereof is as follows. The dual spacer structure is adopted and the sub spacer is included in the liquid crystal panel generally used in the wide temperature range to prevent the occurrence of an irreversible display unevenness and a damage on a panel caused by an external pressure such as a pressure with a finger applied on a panel surface when the main spacers are provided at the relatively low density. In the meanwhile, the PSs 47 in the barrier panel 4 are provided at the low density in the stereoscopic display device 102, however, the barrier panel 4 is disposed on a side of the back surface of the display panel 1 having the dual spacer structure. Thus, even when the external pressure is applied on the display panel 1, the direct external pressure does not act on the barrier panel 4. When the external pressure is applied on the display panel 1 by an interference action by the dual spacer structure of the display panel 1 and the transparent adhesive layer 3, the external pressure applied on the barrier panel 4 is significantly reduced. Accordingly, the sub spacer needs not be disposed on the barrier panel 4, thus the dual spacer structure is not adopted to the barrier panel 4. On the contrary, if the sub spacer is disposed on the barrier panel 4, reduced is the effect in the embodiment 2 that the arrangement density of the PS 47 is reduced to improve visibility of the moire. That is to say, the stereoscopic display device 102 according to the embodiment 2 has a preferred configuration of solving the problems of reducing the visibility of the moire, reducing the occurrence of the air bubble and the luminance unevenness in the barrier panel 4 in the wide temperature range, and reducing the display unevenness and the damage on the panel caused by the external pressure in a balanced manner.

As illustrated in FIG. 8, the arrangement pitch of the PS 47 in the x direction is larger than the arrangement pitch in the y direction. Particularly, the arrangement pitch of the PS 47 in the x direction is 380 μm deviated from 360 μm, which is four times the pixel pitch, by 20 μm, and the arrangement pitch of the PS 47 in the y direction is 290 μm deviated from 270 μm, which is three times the pixel pitch, by 20 μm. This is caused by a main surface of each of the display panel 1 and the barrier panel 4 (also referred to simply "the panel" hereinafter) having a rectangular shape whose x direction is a longitudinal direction and y direction is a short-side direction. That is to say, in the stereoscopic display device 102, the arrangement pitch of the PS 47 is set to be larger in the x direction which is the longitudinal direction of the panel than in the y direction which is the short-side direction thereof. According to the above configuration, the following effect can be obtained. That is to say, when the arrangement pitch of the PS 47 is increased, the pitch of the moire gets large. Thus, the arrangement pitch of the PS 47 is set to be larger in the longitudinal direction of the panel than in the short-side direction thereof, thereby being able to set the pitch of the moire in the longitudinal direction of the panel to be larger than that in the short-side direction thereof. Accordingly, the moire can be hardly visually recognized in the longitudinal direction of the panel in which the difference of the observation angle is large and the moire is easily visually recognized. When the observation point is located away from the display panel 1, it is possible that the moire is not visually recognized in the whole display panel 1. In the meanwhile, when the observation point is closer to the display panel 1, the pitch of the moire decreases, however, according to the arrangement of the PSs 47 described above, the number of moires visually recognized at one time can be reduced even when the moire appears.

In the stereoscopic display device 102, the four pixels 21 arranged in 2-by-2 matrix constitute the picture element 22. Accordingly, the PS 47 disposed at the arrangement pitch deviated from the integral multiple of the pixel pitch is also disposed to be deviated from the picture element pitch. As a result, the color of the pixel in the BM opening 16 from which the PS 47 is exposed is equalized regardless of the observation angle, and a color unevenness is reduced.

In the stereoscopic display device 102, the width and the arrangement pitch of the divided liquid crystal drive electrode 46, which drives the liquid crystal layer 44 in the barrier panel 4, in the x direction is 15 µm. Accordingly, the width and the arrangement pitch of the sub region in the liquid crystal layer 44 in the x direction is 15 µm. In the meanwhile, as described above, the arrangement pitch of the PS 47 in the x direction is 380 µm, which is a value deviated from twenty-five times the arrangement pitch of 15 µm of the sub region by 5 µm. The arrangement pitch of the PS 47 in the y direction is 290 µm, which is a value deviated from nineteen times the arrangement pitch of 15 µm of the sub region by 5 µm. A transmission region and a light shielding region formed in the barrier panel 4 move in units of the sub region as a basic unit, and when the arrangement pitch of the PS 47 coincides with the integral multiple of the arrangement pitch of the sub region, a region where the PS 47 coincides with the light shielding region in the barrier panel 4 and does not interfere with the display at all and a region where the PS 47 coincides with the transmission region in the barrier panel 4 and significantly interferes with the display periodically appear, so that the visibility of the moire increases. In contrast, in the stereoscopic display device 102, the arrangement pitch of the PS 47 in the x direction is deviated from the integral multiple of the arrangement pitch of the sub region in the x direction, thus a degree of the PS 47 overlapping with the light shielding region or the transmission region in the barrier panel 4 gradually change, and the effect of reducing the visibility of the moire can be obtained.

C. Embodiment 3

Figure 9:
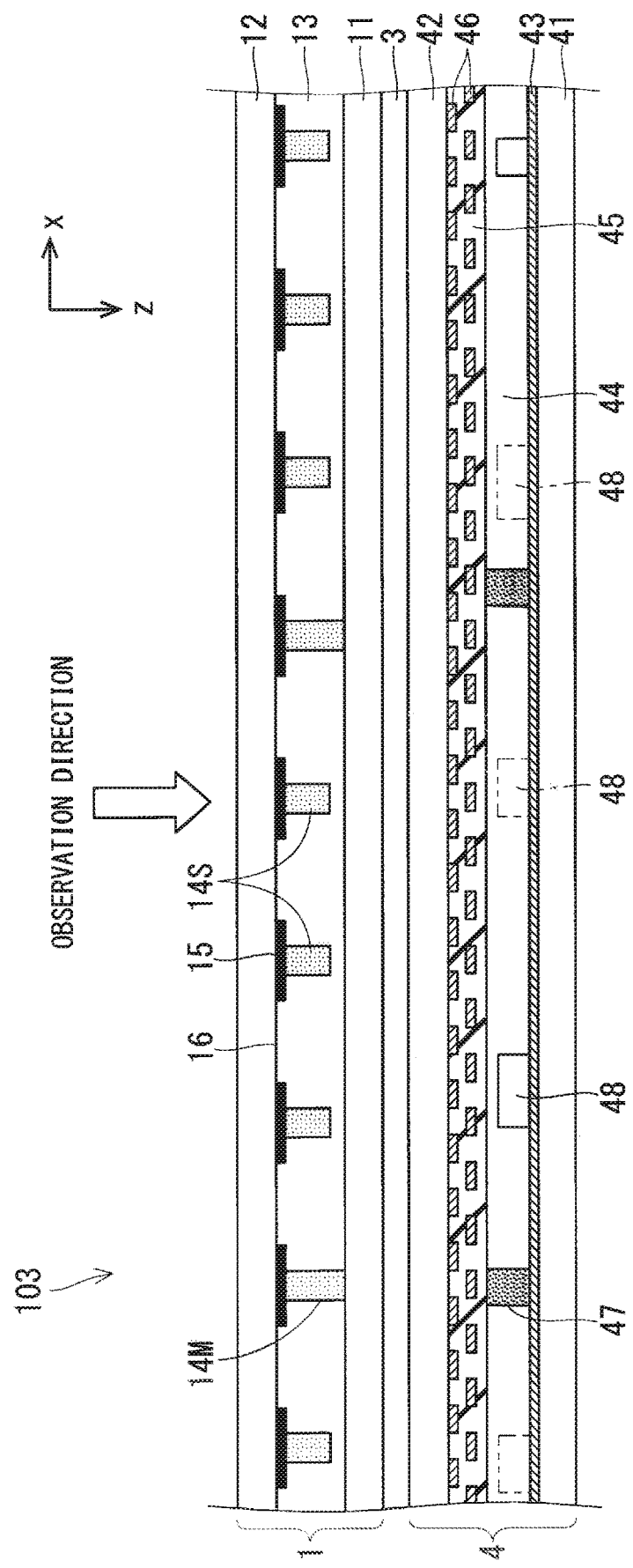
FIG. 9 is a plan view illustrating a positional relationship between PSs in a barrier panel, PSs in a display panel, dummy pattern, and a BM region in the stereoscopic display device according to an embodiment 3.
Figure 10:
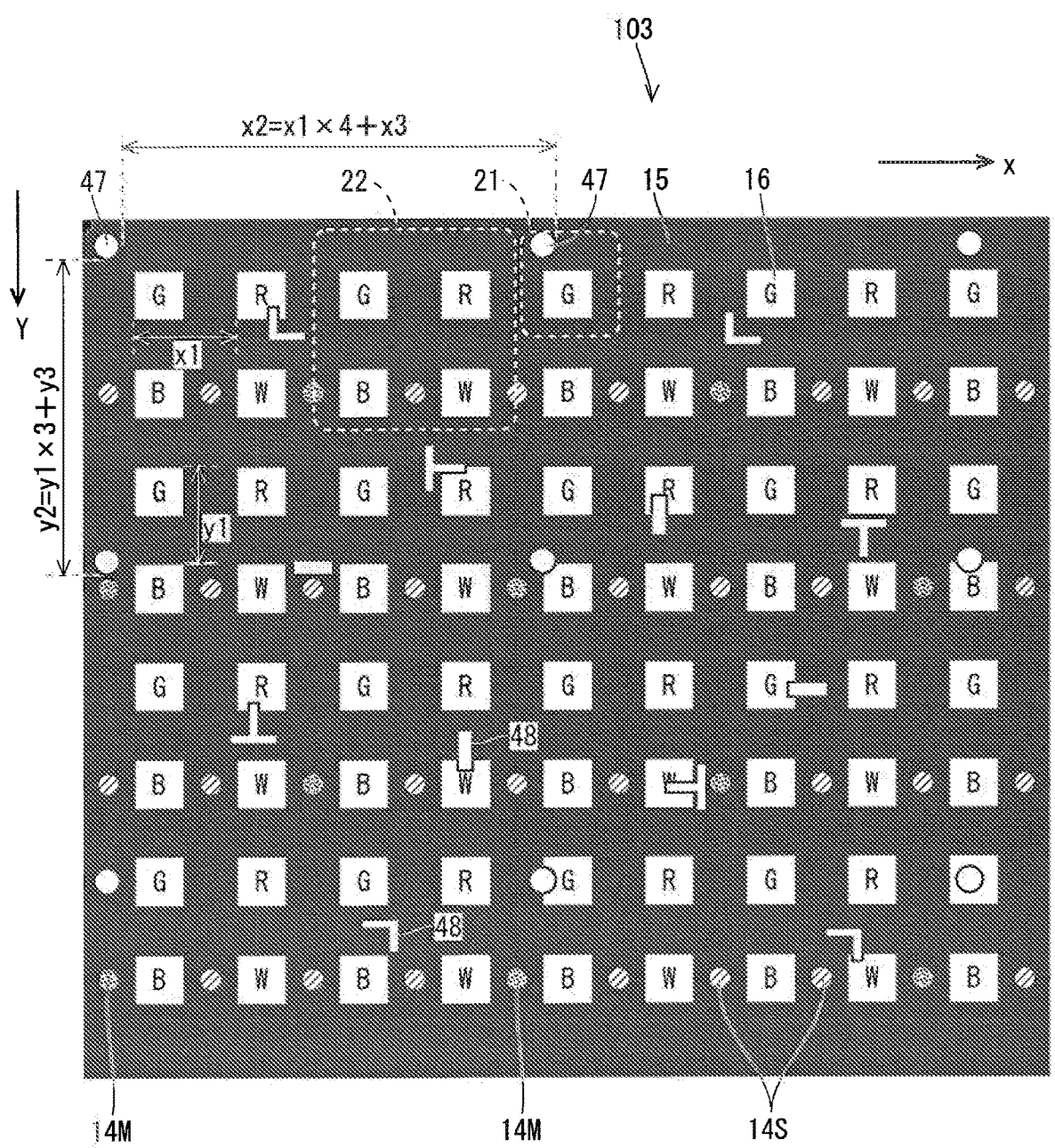
FIG. 10 is a cross-sectional view of the stereoscopic display device according to the embodiment 3 in the x direction.

A stereoscopic display device 103 according to an embodiment 3 is described hereinafter using FIG. 9 and FIG. 10. A whole configuration of the stereoscopic display device 103 is similar to that of the stereoscopic display device 102, and is as illustrated in FIG. 6. FIG. 9 is a cross-sectional view of the stereoscopic display device 103 in an xz plane. FIG. 10 is a planar view illustrating a positional relationship between a PS, a dummy pattern, and a BM in the stereoscopic display device 103. FIG. 9 and FIG. 10 correspond to FIG. 7 and FIG. 8 in the embodiment 2, respectively. In FIG. 9 and FIG. 10, the same reference numerals are assigned to the same or corresponding constituent elements in the embodiment 2. In a configuration of the stereoscopic display device 103, the description hereinafter is focused on a difference with the stereoscopic display device 102, and the description of the common part is appropriately omitted.

As illustrated in FIG. 9, the stereoscopic display device 103 is made up of the stereoscopic display device 102 according to the embodiment 2 in which a plurality of dummy pattern 48 are provided on the barrier panel 4, and has a configuration similar to that of the stereoscopic display device 102 other than the plurality of dummy patterns 48. The dummy pattern 48 is formed of a material in common with the PS 47 in the same layer as the PS 47 and in a region between the PSs 47. The dummy pattern 48 has a length shorter than the PS 47 in a thickness direction of the liquid crystal layer 44, and is provided to be in contact with only one of the glass substrates 41 and 42. FIG. 9 illustrates the dummy pattern 48 being in contact with only the glass substrate 41 on which the liquid crystal drive electrode 43 is provided as one layer, however, the dummy pattern 48 may be in contact with only the glass substrate 42.

When an operating temperature of the stereoscopic display device 103 gets low, a volume of the liquid crystal layer 44 in the barrier panel 4 decreases, and a thickness thereof decreases. The dummy pattern 48 has a length sufficiently different from that of the PS 47 in the thickness direction of the liquid crystal layer 44 so as not to come in contact with the glass substrate 42 not only in normal times but also in such a case. Accordingly, the dummy pattern 48 does not prevent the change of the height of the PS 47 following the change of the thickness of the liquid crystal layer 44 in accordance with the temperature change.

FIG. 9 illustrates an example that the dummy pattern 48 is formed on the glass substrate 41 which is the substrate on the side of the back surface of the barrier panel 4. However, the dummy pattern 48 may be formed on the glass substrate 42 which is the substrate on the side of the front surface of the barrier panel 4. The barrier panel 4 itself may be disposed so that the front surface and the back surface of the barrier panel 4 are reversely located.

Next, a shape of the dummy pattern 48 in a planar view, that is to say, a planar pattern shape is described using FIG. 10. FIG. 10 illustrates the dummy patterns 48 having various planar patterns such as I-shape, L-shape, and T-shape. These dummy patterns 48 are disposed in various positions and directions. In this manner, the dummy pattern 48 preferably has the plurality of planar pattern shapes. That is to say, the planar pattern shapes of the plurality of dummy patterns 48 are preferably different from each other.

In the stereoscopic display device 103, the PSs 47 are provided at the large pitch and relatively low density as described in the embodiment 2. When an area density of the PS 47 decreases, a luminance change in each position caused by the PS 47 increases. Thus, in a stereoscopic display device 104, the dummy pattern 48 is disposed in the region between the PSs 47, thereby equalizing the luminance distribution caused by the PSs 47. The PS and the dummy pattern 48 are not close to each other but dispersedly disposed to achieve the purpose described above.

It is preferable that when the dummy pattern 48 partially overlaps with the BM opening 16, an overlapping area and a shape of an overlapping region differ depending on each dummy pattern 48. Thus, a size of the dummy pattern 48 in the x direction and the y direction is preferably larger than the PS 47 and is more preferably approximately equivalent to that of the BM opening 16. The plurality of dummy patterns 48 having the different planar pattern shapes and directions are preferably disposed to eliminate regularity regarding the overlapping area and the shape of the overlapping region of the dummy pattern 48 overlapping with the BM opening 16. In the case of the pattern shapes according to the above configuration, preferably selected as the dummy pattern 48 are not only the I-shape, the L-shape, and the T-shape described above as the example but also a relatively simple pattern such as an optional signal or an alphabetical character and a pattern having low symmetry regarding line symmetry or rotation symmetry so that the shape changes by changing a direction.

It is hard to design the position, shape, and direction of each dummy pattern 48 in the whole surface of the barrier panel 4 in a wholly random manner. Thus, it is applicable to design the pattern arrangement in which the position, shape, and direction of the dummy pattern 48 vary as described above in a range of approximately three to five pitches of the PSs 47, for example, and sequentially arrange the pattern arrangement as a basic unit in the whole surface of the barrier panel 4.

According to the stereoscopic display device 103, the plurality of dummy patterns 48 having the shapes and directions different from each other are dispersedly disposed in moderation in the region between the PSs 47, thus the luminance distribution caused by the PSs 47 is equalized, and the visibility of the moire can be effectively reduced. When the dummy pattern 48 overlaps with the BM opening 16, the area and shape of the overlapping region variously change. Thus, periodicity of the luminance for each color of the pixel is equalized, and the color unevenness can be effectively reduced.

In the stereoscopic display devices 101, 102, and 103 according to the embodiments 1 to 3, the pixels 21 of the four colors of R, G, B, and W arranged in 2-by-2 as the basic unit constitute the picture element 22. However, the pixels 21 of the three colors of R, G, and B as the basic unit may constitute the picture element as in the case of a general LCD. In this case, a ratio of the pixel pitch between the x direction and they direction is 1:3.

In the stereoscopic display devices 101, 102, and 103 according to the embodiments 1 to 3, the display panel 1 is the liquid crystal panel in which the liquid crystal layer 13 is sandwiched between the glass substrates 11 and 12. That is to say, the display unit is the liquid crystal panel. However, the display unit may be a display panel having the other configuration such as an organic EL display, a plasma display, or a CRT display as long as the positional relationship between the pixel and BM in the display unit and the PS 47 disposed on the barrier panel 4 satisfies features described in the embodiments 1 to 3. When the display unit is a self-emitting type display device, the barrier panel 4 is disposed on a side of the front surface of the display unit, that is to say, a side of the observation point. Also in the case of applying the display panel having the other configuration to the display unit, the basic effect in the embodiments 1 to 3 described above can be obtained.

According to the present invention, the above embodiments can be arbitrarily combined, or each embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A stereoscopic display device, comprising:
   a display unit; and
   a light barrier element disposed to overlap with the display unit, wherein the display unit includes:
   a black matrix region which does not emit display light; and
   a plurality of pixels, each of which is an opening in the black matrix region and emits display light,
   the plurality of pixels are arranged at a regular pitch in a first direction being a horizontal direction and a second direction being a vertical direction,
   the light barrier element includes:
   a pair of barrier substrates;
   a first liquid crystal layer provided between the pair of barrier substrates; and
   a plurality of first spacers provided between the pair of barrier substrates,
   the plurality of first spacers are arranged in a grid pattern at a regular pitch in the first direction and the second direction, each first spacer in each horizontal row of first spacers being vertically aligned with a first spacer in every other horizontal row of first spacers, and each first spacer in each vertical column of first spacers being horizontally aligned with a first spacer in every other vertical column of first spacers, and
   arrangement pitches of the plurality of first spacers in the first direction and the second direction are not integral multiples of arrangement pitches of the plurality of pixels in the first direction and the second direction.

2. The stereoscopic display device according to claim 1, wherein
   each one of the plurality of first spacers is provided for ten or more of the plurality of pixels which are sequentially disposed.

3. The stereoscopic display device according to claim 1, wherein
   the display unit includes:
   a pair of display substrates;
   a second liquid crystal layer provided between the pair of display substrates;
   a plurality of main spacers provided between the pair of display substrates to be contact with the pair of display substrates; and
   a plurality of sub spacers provided between the pair of display substrates to be in contact with one of the pair of display substrates and having a length shorter than the plurality of main spacers in a thickness direction of the second liquid crystal layer, and
   an arrangement density of the plurality of first spacers on the pair of barrier substrates is equal to or smaller than an arrangement density of the plurality of main spacers on the pair of the display substrates.

4. The stereoscopic display device according to claim 1, wherein
   the plurality of first spacers are in contact with the pair of barrier substrates, and
   an arrangement density of the plurality of first spacers on the pair of barrier substrates is equal to or larger than 0.1% and smaller than 0.3%.

5. The stereoscopic display device according to claim 1, wherein
   a main surface of the pair of barrier substrates has a shape having a longitudinal direction in the first direction and a short-side direction in the second direction,
   the first liquid crystal layer has a plurality of sub regions capable of independently transmitting or blocking light, arranged at a regular pitch in the first direction, and extending in the second direction, and
   arrangement pitches of the plurality of first spacers in the first direction are not integral multiples of arrangement pitches of the plurality of sub regions in the first direction.

6. The stereoscopic display device according to claim 1, wherein
   a main surface of the pair of barrier substrates has a shape having a longitudinal direction in the first direction and a short-side direction in the second direction, and
   arrangement pitches of the plurality of first spacers in the first direction are larger than arrangement pitches in the second direction.

7. The stereoscopic display device according to claim 1, wherein
   the light barrier element includes a plurality of dummy patterns, in a region between the plurality of first spacers between the pair of barrier substrates, being in contact with one of the pair of barrier substrates and having a length shorter than the plurality of first spacers in a thickness direction of the first liquid crystal layer.

8. The stereoscopic display device according to claim 7, wherein shapes of the plurality of dummy patterns in a plan view are different from each other.

* * * * *